Dec. 29, 1925.  1,567,578
W. E. DÖRR
GAS DISCHARGE FROM AIRSHIPS
Filed March 1, 1923   3 Sheets-Sheet 1
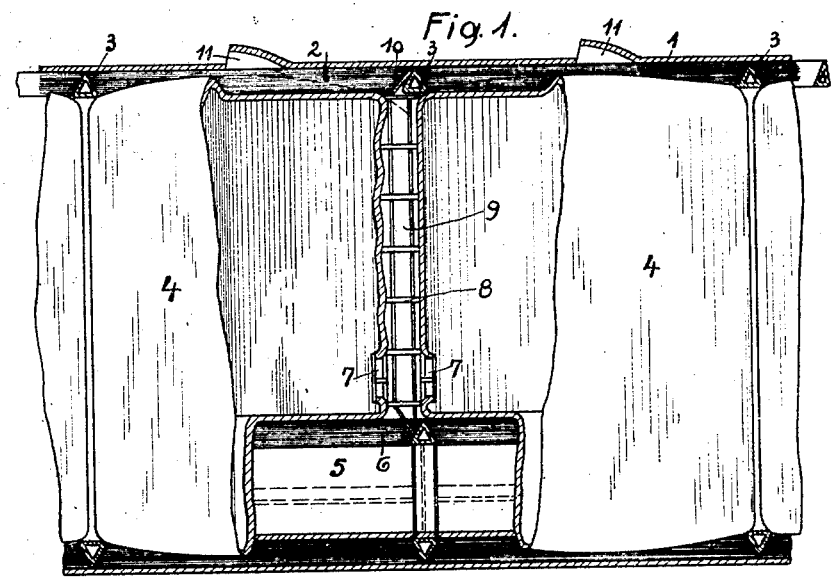
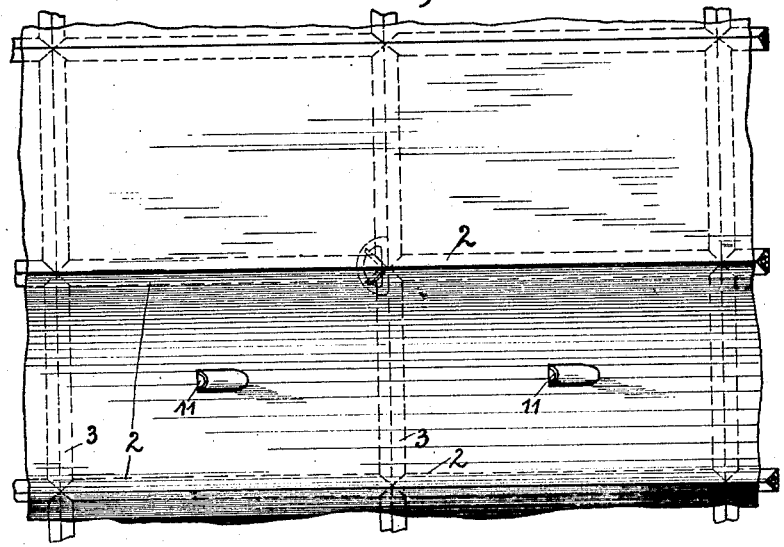
INVENTOR:
Wilhelm Ernst Dörr.

Dec. 29, 1925. 1,567,578
W. E. DÖRR
GAS DISCHARGE FROM AIRSHIPS
Filed March 1, 1923    3 Sheets-Sheet 2
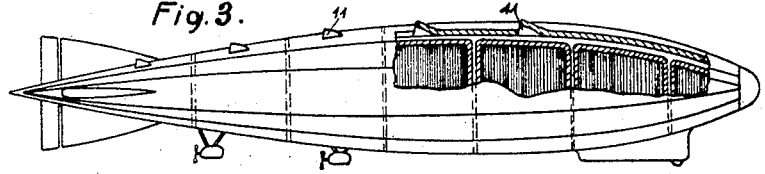
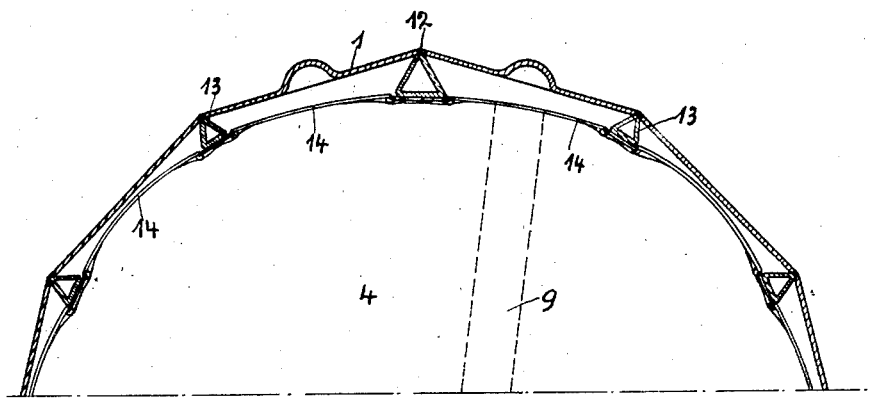
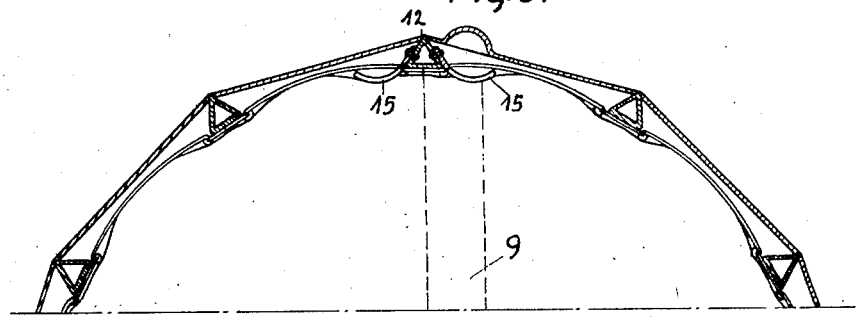
JNVENTOR:

Dec. 29, 1925.
W. E. DÖRR
1,567,578
GAS DISCHARGE FROM AIRSHIPS
Filed March 1, 1923
3 Sheets-Sheet 3

JNVENTOR:

Patented Dec. 29, 1925.

1,567,578

UNITED STATES PATENT OFFICE.

WILHELM ERNST DÖRR, OF UEBERLINGEN, GERMANY, ASSIGNOR TO LUFTSCHIFFBAU ZEPPELIN G. M. B. H., OF FRIEDRICHSHAFEN, GERMANY.

GAS DISCHARGE FROM AIRSHIPS.

Application filed March 1, 1923. Serial No. 622,096.

*To all whom it may concern:*

Be it known that I, WILHELM ERNST DÖRR, a citizen of Germany, residing at Ueberlingen, Germany, have invented certain new and useful Improvements in Gas Discharges from Airships, of which the following is a specification.

My invention has reference to improved means for effecting the discharge of the gas from airships of the rigid type.

As heretofore practiced, the gas escaping from the overpressure valves arranged in the walls of the gas cells has been made to escape through upwardly directed flues and directly into the open air, the eduction openings of the outer envelope enclosing the cells being disposed in the median plane of the ship and preferably in the immediate vicinity of a point of juncture of a longitudinal member with one of the annular crossframes. This arrangement, however, involves the drawback that it presents a great source of danger in case of lightning, inasmuch as the points of juncture of the ridge girders are particularly exposed to the danger of being struck by lightning.

With a view to increasing the safety of rigid airships from the danger of lightning my invention makes provision for arranging the discharge openings in the outer envelope for the escape of the gas and of the gas and air mixture at a considerable distance from the points of juncture. I further provide means for arranging the said discharge openings in the fields between the annular frames and remote from such frames. By this means and in combination therewith it becomes possible to guide the gas escaping from the valves in such a manner within the hull of the ship that the main gas eduction passages will not be situated above a point of juncture of the framework. This effect may also be produced in the case of gas-discharging means making use of a shaft or flue which is in direct open communication with the outside air, but the novel arrangement of means in accordance with the present invention is of special importance in connection with flues or shafts through which the gas is caused to pass upwardly between the cells and introduced into the space confined between the cells and the outer envelope. In this case there is no necessity of a special curved conduit for the gases, and there is the additional important advantage realized by having the gas-eduction conduit terminating within the envelope that by reason of this communication with the space enclosed by the envelope a communicating compensating connection is produced between several escape openings.

There is the further advantage that the stagnant or foul gas residue existing within the space confined between the envelope and the cells by reason of leakage of the cells or compartments including those occurring through injuries of the ship may escape to the outside air through the same openings in the outer envelope.

My invention also provides for dispensing entirely with escape openings to the outside air in the front part or bow portion of the ship in view of the increased danger of lightning in such front part, and with this end in view the conduits in the front part are conducted only into the space enclosed within the envelope, from which the gases will then be rearwardly discharged through the escape openings.

If the quantity of the gas to be educted should require it, a special gas-conducting passage may be provided in the upper portion of the ship running in the longitudinal direction thereof and into which the several gas flues terminate.

Such gas passages may be provided for by a corresponding enlargement of the jacket space of the ship below the envelope, thus for instance by providing special structural means in the upper part of the ship at which the walls of the gas cells are bent inwards to form a reentrant portion, or by providing for the tightening between several upper longitudinal members of the framework loosely confining the bulged-out compartments.

Means are also provided for a special arrangement and configuration, to be described farther below, of the escape openings in view of a further diminishing of the danger from lightning.

My invention further makes provision for improving the discharge of the gases and for doing away with the inconveniences of the suction heads or nozzles mounted upon the outer envelope of the ship which, however, as heretofore constructed, greatly increase the danger from lightning and create an additional resistance for the propulsion of the vehicle. My invention in contradistinction thereof makes use of countersunk nozzles for discharging the gas through the outer envelope without projecting therefrom. In connection therewith the gas is conducted to the outside and approximately in the direction of the wind resulting from the propulsion, from the space within the envelope or from the particular passage or flue in an upwardly inclined direction through an upwardly open cochlear or spoon-like nozzle which is situated within the envelope of the hull.

The possibility of rain entering through an uncovered opening of this kind is of no material importance, because in the case of directly impinging rain it would only be the question of a comparatively small quantity thereof which may be conducted away by positive means, whenever required. The far more considerable drifting water which in the case of rain is carried along the hull of the ship, is held back according to my invention by suitable means, preferably consisting of a bar, ledge or the like mounted in front of the opening and adapted to the figuration thereof.

A further provision for the prevention of the effects of lightning strokes upon the gas eduction means hereinbefore referred to is constituted in accordance with this invention by the mounting of a kind of lightning protector at an appropriate distance from each escape opening, such lightning protector comprising for instance a serrated piece of sheetmetal, a button or the like.

The invention will be more fully explained with reference to the accompanying drawings showing by way of example various embodiments thereof.

In the drawings:

Fig. 1 is a vertical axial section, partly in elevation, of a rigid airship;

Fig. 2 is a partial plan view on an enlarged scale with the escape openings situated in the middle line of the several fields, instead of being mounted adjacent the longitudinal members.

Fig. 3 illustrates at a considerably reduced scale a total side view of an airship, partly in longitudinal section.

Fig. 4 is a transverse section illustrating a form of construction of the enlarged jacket space surrounding the cells within the envelope, with eduction openings arranged in pairs.

Fig. 5 shows the enlarged jacket space in the vicinity of the ridge in a modified form of construction.

Figure 6:
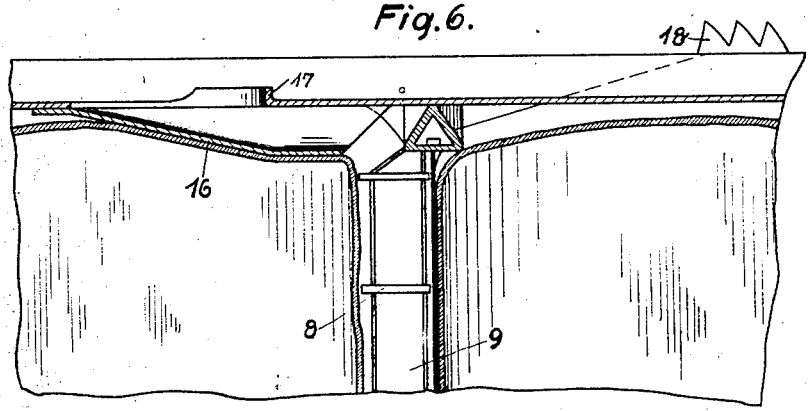
Figs. 6 and 7 are a longitudinal section and a corresponding plan view respectively of one of the preferred constructions of a countersunk gas discharge opening.

Referring particularly to Figure 1 of the drawing, the outer envelope 1 of the hull extends over the longitudinal members 2 and the annular cross frames 3. The gas cells 4 apply themselves from within against the framework of the hull comprising the longitudinal members and transverse frames, and in the lower portion of the ship they embrace the gangway or gallery 5, the upper longitudinal supporting beam of which is indicated at 6. The cells 4 are provided with valves 7 adapted to open into a gas discharge flue 9 which is kept open between two adjoining cells by frames 8. Through this flue 9 the gas escaping from the valve 7 is conducted into the jacket space 10 from which it may be discharged through the openings 11. These openings, in the construction illustrated in Figure 1 of the drawing, are arranged centrally between the points of juncture formed by the longitudinal members 2 and the annular frames 3. In the plan view shown in Figure 2 the escape openings 11 are situated substantially in the centers of the field sections formed by the longitudinal members 2 and the annular frames 3.

In Fig. 3 a modification of an airship is shown in which no escape openings are provided in the front part or bow portion.

In the construction disclosed in Fig. 4 the jacket space is enlarged at its upper portion, this being accomplished, for instance, by making the longitudinal ridge members 12 of a somewhat greater structural height than the normal longitudinal members 13, and further by the expedient of tightening the loose bracing wires 14 serving for confining the bulging out of the cells between the two upper longitudinal members 13 and the ridge support 12, so as to create an enlarged space between the outer envelope 1 and the cells 4 and providing a kind of passage or channel along the ridge member for any volume of gases. The escape openings are arranged in pairs substantially in the middle of the field sections. The main gas eduction conduit 9 is not contiguous with any of the points of juncture.

In accordance with the modified construction shown in Fig. 5 the enlargement of the jacket space is accomplished by special structural means on the sides of which the cells are bent inwards. On the ridge member 12 and suitably spaced from each other yokes 15 may, for instance, be provided which may also be connected among each other, thus for example by a stiffening net or the like. Frame or skeleton shaped structural parts for the production of a logitudinal channel may be provided at any suitable part.

Figure 7:
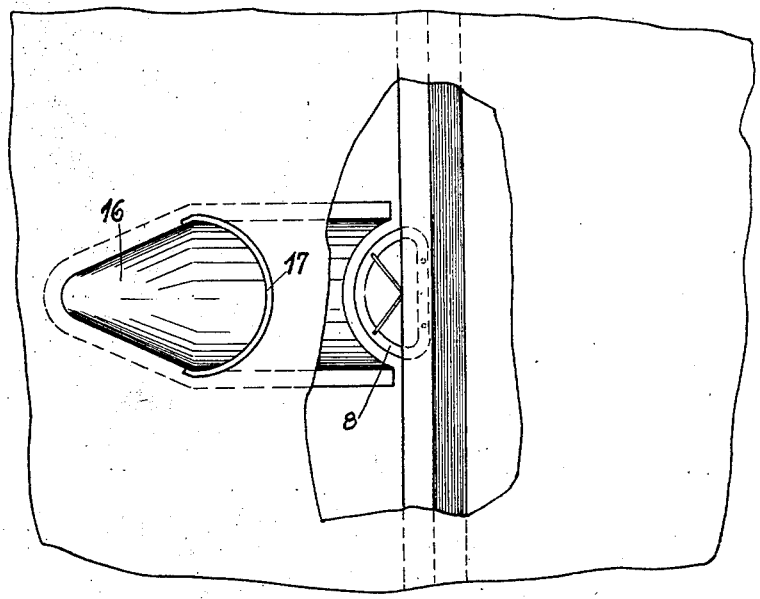

In Figs. 6 and 7 I have shown a form of escape opening adapted to produce a smooth outer surface of the ship combined with unobjectionable gas discharge by conducting the gas from the jacket space below the envelope along an upwardly extending surface 16 which is slightly inclined with relation to the outer envelope. The guiding surface possesses a kind of spoonlike curvature. Around the front portion of the opening a edge or bar 17 is mounted upon the outer envelope, by means of which the drifting water running along upon the surface of the ship is held back, and on the other hand the suction is increased.

At a certain distance from the opening a lightning protector which may be constituted for instance by a serrated sheet-metal piece 18, may be arranged which is in metallic connection with the framework of the hull.

My invention is capable of various other modifications and alterations without departing from the essential features of the invention so as to adapt the same to varying conditions of application and to suit the convenience of the operator.

I claim:—

1. A rigid airship comprising a hull consisting of longitudinal and of cross members, a cover on said hull, gas cells within said hull, valves in the walls of said gas cells, gas passages between said gas cells in the planes of said cross members and offset bends at the upper ends of said passages having outlets remote from the intersection of cross members and longitudinal members.

2. A rigid airship comprising a hull consisting of longitudinal and of cross members, a cover on said hull, gas cells within said hull, valves in the walls of said gas cells, gas passages between said gas cells, offset bends at the upper ends of said passages, and countersunk outlets at the ends of said bends adapted to discharge the gas, approximately in the direction of the outer air current, said outlets being remote from the intersection of said longitudial members with said cross members.

3. A rigid airship comprising a hull consisting of longitudinal and of cross members, a cover on said hull, gas cells within said hull, valves in the walls of said gas cells, gas passages leading from said valves to outlets in said outer cover, and lightning conductors connected with the hull and situated forward of said outlets, said outlets being remote from the intersection of said longitudinal members with said cross members.

In testimony whereof I affix my signature.

WILHELM ERNST DÖRR.